United States Patent
Matsusue

(10) Patent No.: US 11,888,193 B2
(45) Date of Patent: Jan. 30, 2024

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 17/649,235

(22) Filed: Jan. 28, 2022

(65) Prior Publication Data

US 2022/0246964 A1  Aug. 4, 2022

(30) Foreign Application Priority Data

Feb. 3, 2021  (JP) .................. 2021-015629

(51) Int. Cl.
*H01M 8/04* (2016.01)
*H01M 8/04746* (2016.01)
*H01M 8/0438* (2016.01)
*H01M 8/04537* (2016.01)

(52) U.S. Cl.
CPC ..... *H01M 8/04753* (2013.01); *H01M 8/0438* (2013.01); *H01M 8/04582* (2013.01); *H01M 2250/20* (2013.01)

(58) Field of Classification Search
CPC .......... H01M 8/04753; H01M 8/0438; H01M 8/04582; H01M 2250/20
USPC ...................................... 429/444
See application file for complete search history.

(56) References Cited

U.S. PATENT DOCUMENTS

| | | | |
|---|---|---|---|
| 2012/0315559 A1 | 12/2012 | Noh et al. | |
| 2013/0164644 A1* | 6/2013 | Noh .................. | H01M 8/04432 429/430 |
| 2014/0120439 A1* | 5/2014 | Makino ............. | H01M 8/04365 429/429 |
| 2015/0333339 A1* | 11/2015 | Noh .................. | H01M 8/04097 239/583 |
| 2017/0149077 A1* | 5/2017 | Ichikawa .......... | H01M 8/04828 |
| 2019/0074529 A1* | 3/2019 | Min .................. | H01M 8/04388 |

FOREIGN PATENT DOCUMENTS

| | | |
|---|---|---|
| JP | 2008153071 A | 7/2008 |
| JP | 2012255429 A | 12/2012 |

\* cited by examiner

*Primary Examiner* — James M Erwin
(74) *Attorney, Agent, or Firm* — Dickinson Wright, PLLC

(57) ABSTRACT

The fuel cell system is a fuel cell system wherein, when the amount of power generated by a fuel cell is determined to be equal to or less than a predetermined threshold, a controller issues an intermittent supply command to intermittently supply fuel gas to the fuel cell; wherein the intermittent supply command includes a first intermittent supply command and a second intermittent supply command; wherein the first intermittent supply command increases the flow rate of the fuel gas by setting the opening degree during pressure rise of a linear solenoid valve to relatively more than the second intermittent supply command; and wherein, after the first intermittent supply command, the second intermittent supply command decreases the flow rate of the fuel gas for a predetermined time by setting the opening degree during pressure rise of the linear solenoid valve to relatively less than the first intermittent supply command.

1 Claim, 4 Drawing Sheets

FUEL CELL SYSTEM

TECHNICAL FIELD

The present disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be simply referred to as "stack") composed of stacked unit fuel cells (hereinafter may be referred to as "cell"). In many cases, the fuel gas and oxidant gas actually supplied to the fuel cell are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit fuel cells may be collectively referred to as "fuel cell".

In general, the unit fuel cell includes a membrane electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separator has a structure such that a groove is formed as a reaction gas flow path on a surface in contact with the gas diffusion layer. The separator has electron conductivity, and it functions as a collector of generated electricity.

In the fuel electrode (anode) of the fuel cell, hydrogen ($H_2$) as the fuel gas supplied from the gas flow path and the gas diffusing layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode, reacts with protons and electrons in the catalyst layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle"). Also, a technique for supplying fuel gas to the stack of a fuel cell system using an ejector, by increasing and decreasing the pressure of the fuel gas in a pulsed manner at low loads, is under study.

For example, Patent Literature 1 discloses a systems in which a solenoid valve is connected to the nozzle of an ejector.

In Patent Literature 2, an ejector system including a solenoid is disclosed, which is a technique such that when started at low temperature, a fuel gas flowing volume adjusting means changes a switching threshold to increase the fuel gas flowing volume.

Patent Literature 1: Japanese Patent Application Laid-Open (JP-A) No. 2012-255429
Patent Literature 2: JP-A No. 2008-153071

In the pulsating operation of the pressure of a fuel cell, it is needed to consider drainage capacity for discharging water from a flow path. Water blocking the flow path can be discharged by blowing off the water by using a pressure difference between the upstream and downstream sides of the water. However, water attached to the wall surface of the flow path cannot be sufficiently discharged only by utilizing the pressure difference. Accordingly, in order to sufficiently discharge the water attached to the wall surface of the flow path, it is necessary to slow the movement of the gas and push out the water over time. In the above Patent Literature 1, the pulse flow rate is controlled for low power, the gas flow rate is increased in a short time by increasing the valve opening degree. Due to the water discharge using the pressure difference, there is a concern that the water attached to the wall surface of the flow path cannot be sufficiently discharged.

SUMMARY

An object of the disclosed embodiments is to provide a fuel cell system configured to discharge water blocking a flow path and configured to sufficiently discharge water attached to the wall surface of the flow path.

In a first embodiment, there is provided a fuel cell system comprising: a fuel cell,
an ejector,
a fuel gas supplier which supplies fuel gas to the ejector,
a circulation flow path which recovers fuel off-gas discharged from the fuel cell to return the fuel off-gas to the ejector as circulation gas,
a fuel gas supply flow path which connects the ejector with the fuel gas supplier to supply the fuel gas to the ejector,
a fuel gas flow rate control valve which is disposed on the fuel gas supply flow path to control a flow rate of the fuel gas supplied to the ejector,
a mixed gas supply flow path which connects the ejector with the fuel cell to supply mixed gas containing the fuel gas and the circulation gas from the ejector to a fuel electrode of the fuel cell,
a pressure detector which detects pressure information on a fuel electrode side of the fuel cell,
a current detector which detects a current amount of the fuel cell, and
a controller,
wherein the fuel gas flow rate control valve is a linear solenoid valve to control an opening degree of the fuel gas flow rate control valve;
wherein, from the current amount, the controller determines whether or not the amount of power generated by the fuel cell is equal to or less than a predetermined threshold;
wherein, when the amount of the power generated by the fuel cell is determined to be equal to or less than the predetermined threshold, the controller issues an intermittent supply command to intermittently supply the fuel gas to the fuel cell;
wherein the intermittent supply command includes a first intermittent supply command and a second intermittent supply command;
wherein the first intermittent supply command increases the flow rate of the fuel gas by setting the opening degree during pressure rise of the linear solenoid valve to relatively more than the second intermittent supply command; and
wherein, after the first intermittent supply command, the second intermittent supply command decreases the flow rate of the fuel gas for a predetermined time by setting the opening degree during pressure rise of the linear solenoid valve to relatively less than the first intermittent supply command.

In the fuel cell system of the present disclosure, for the first intermittent supply command, the opening degree during pressure rise of the linear solenoid valve may be 100%.

According to the fuel cell system of the present disclosure, the water blocking the flow path can be discharged, and the water attached to the wall surface of the flow path can be sufficiently discharged.

BRIEF DESCRIPTION OF THE DRAWINGS

In the accompanying drawings.

DETAILED DESCRIPTION

Figure 1:
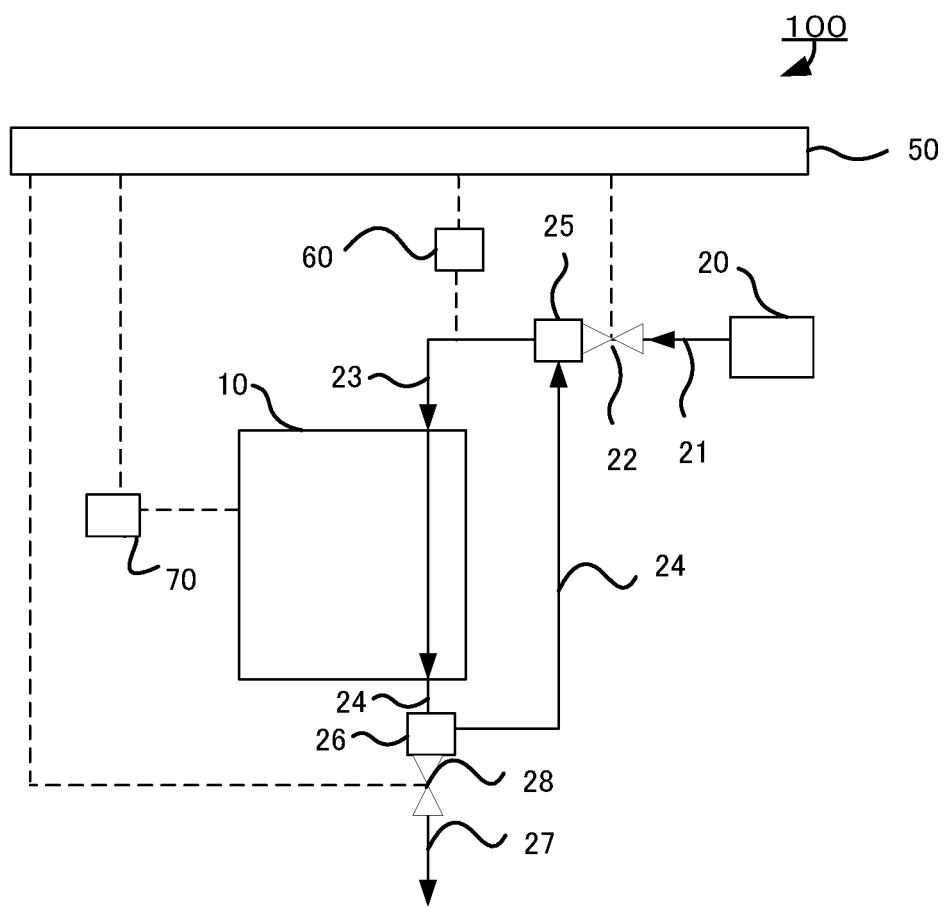
FIG. 1 is a schematic configuration diagram showing an example of the fuel cell system of the disclosed embodiments.

The fuel cell system of the disclosed embodiments is a fuel cell system comprising:
a fuel cell,
an ejector,
a fuel gas supplier which supplies fuel gas to the ejector,
a circulation flow path which recovers fuel off-gas discharged from the fuel cell to return the fuel off-gas to the ejector as circulation gas,
a fuel gas supply flow path which connects the ejector with the fuel gas supplier to supply the fuel gas to the ejector,
a fuel gas flow rate control valve which is disposed on the fuel gas supply flow path to control a flow rate of the fuel gas supplied to the ejector,
a mixed gas supply flow path which connects the ejector with the fuel cell to supply mixed gas containing the fuel gas and the circulation gas from the ejector to a fuel electrode of the fuel cell,
a pressure detector which detects pressure information on a fuel electrode side of the fuel cell,
a current detector which detects a current amount of the fuel cell, and
a controller,
wherein the fuel gas flow rate control valve is a linear solenoid valve to control an opening degree of the fuel gas flow rate control valve;
wherein, from the current amount, the controller determines whether or not the amount of power generated by the fuel cell is equal to or less than a predetermined threshold;
wherein, when the amount of the power generated by the fuel cell is determined to be equal to or less than the predetermined threshold, the controller issues an intermittent supply command to intermittently supply the fuel gas to the fuel cell;

wherein the intermittent supply command includes a first intermittent supply command and a second intermittent supply command;
wherein the first intermittent supply command increases the flow rate of the fuel gas by setting the opening degree during pressure rise of the linear solenoid valve to relatively more than the second intermittent supply command; and
wherein, after the first intermittent supply command, the second intermittent supply command decreases the flow rate of the fuel gas for a predetermined time by setting the opening degree during pressure rise of the linear solenoid valve to relatively less than the first intermittent supply command.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

For the water discharge of the fuel cell system, the water blocking the flow path is instantaneously discharged by blowing the reaction gas. However, since the water attached to the wall surface of the flow path moves more slowly than the gas, it is needed to secure the time to discharge the water attached to the wall surface of the flow path.

In the control of the flow rate of the fuel gas, ensuring the time required for water discharge by pulse control using an injector or a linear solenoid valve, may be difficult. With the injector, its opening degree can only be made to be 0% or 100%, and since fine opening control is not possible, the water discharge time cannot be increased unless a large pressure pulsation width is allowed. Fine opening control is possible with a linear solenoid valve. However, in the technique for avoiding valve collisions as in the prior art, since the flow gas is basically supplied at a large flow rate, the water discharge time cannot be increased unless a large pressure pulsation width is allowed, as with the pulse control using an injector.

If the injection flow rate of the fuel gas is increased for water discharge, the pressure is increased and reaches the upper limit of the pressure at which the fuel cell can be used. In addition, a pressure increase is also caused by securing the water discharge time by increasing the valve opening time, and the upper limit of the pressure at which the fuel cell can be used, is reached.

According to the disclosed embodiments, in the pulse control using the linear solenoid valve, by controlling the upper limit of the opening degree of the linear solenoid valve, both a large pulsating operation (in which the opening degree for blowing the flow path-blocking water is relatively large) and a small pulsating operation (in which the opening degree for discharging the water attached to the wall surface over time is relatively small) are performed in combination. Accordingly, the water discharge time is ensured with suppressing a pressure increase.

In the disclosed embodiments, first, the opening degree of the linear solenoid valve is increased to accelerate the pressure rise of the fuel gas. A pressure difference is made between the upstream and downstream sides of the water by supplying the fuel gas whose pressure rise is accelerated, thereby blowing the water blocking the flow path. Then, the opening degree of the linear solenoid valve is decreased to slow down the pressure rise. The water attached to the wall is slowly pushed out by supplying the fuel gas whose pressure rise is slowed down.

If there are a plurality of fuel gas flow paths all of which are blocked by water, it is possible to make a pressure difference even in the fuel gas supply with a small opening degree of the linear solenoid valve, and it is possible to discharge the blocking water. In many cases, however, only some flow paths are generally blocked by water. Accordingly, the fuel gas enters the blocked flow paths through the unblocked flow paths and makes it difficult to cause a pressure difference between the upstream and downstream sides of the water. Accordingly, it is first necessary to vigorously supply the fuel gas by increasing the opening degree of the linear solenoid valve.

According to the disclosed embodiments, first, the water blocking the flow path is discharged, and then the time for the fuel gas to flow is lengthened to secure the time necessary to complete the discharge of the water attached to the wall surface of the flow path, whereby the attached water and water that tends to remain on the outlet side of the flow path can be sufficiently discharged. According to the disclosed embodiments, water discharge can be completed more quickly and with better fuel efficiency than conventional water discharge control.

The fuel cell system of the present disclosure includes the fuel cell, the ejector, the fuel gas supplier, the circulation flow path, the fuel gas supply flow path, the fuel gas flow control valve, the mixed gas supply flow path, the pressure detector, the current detector and the controller.

In general, the fuel cell system of the disclosed embodiments is installed and used in a fuel cell electric vehicle including a motor as a driving source.

The fuel cell system of the disclosed embodiment may be installed and used in a vehicle that can be run by the power of a secondary cell.

The motor is not particularly limited, and it may be a conventionally-known driving motor.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbon material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The fuel cell system includes the fuel gas supplier. The fuel gas supplier supplies the fuel gas to the ejector.

As the fuel gas supplier, examples include, but are not limited to, a fuel tank such as a liquid hydrogen tank and a compressed hydrogen tank.

The fuel gas supplier is electrically connected to the controller. The fuel gas supplier is driven according to a control signal from the controller.

The fuel cell system includes the fuel gas supply flow path.

The fuel gas supply flow path connects the ejector and the fuel gas supplier. The fuel gas supply flow path allows the supply of the fuel gas to the ejector.

The fuel cell system includes the fuel gas flow rate control valve.

The fuel gas flow rate control valve is disposed on the fuel gas supply flow path. The fuel gas flow rate control valve controls the flow rate of the fuel gas supplied to the ejector.

The fuel gas flow rate control valve is electrically connected to the controller. The opening degree of the fuel gas flow rate control valve is controlled according to the control signal from the controller. By the controller, the fuel gas flow rate control valve may control the pressure of the fuel gas supplied from the fuel gas supplier to the ejector.

The fuel gas flow rate control valve is a linear solenoid valve. The linear solenoid valve is not particularly limited, as long as it can control the opening degree.

The fuel cell system includes a mixed gas supply flow path.

The mixed gas supply flow path connects the ejector and the anode inlet of the fuel cell. The mixed gas supply flow path allows the supply of the mixed gas containing the fuel gas and the circulation gas from the ejector to the fuel electrode of the fuel cell.

The fuel cell system includes the circulation flow path.

The circulation flow path allows the fuel off-gas discharged from the anode of the fuel cell to be recovered and returned to the ejector as the circulation gas.

The circulation flow path may connect the anode outlet of the fuel cell and the ejector. The circulation flow path may branch from a fuel off-gas discharge flow path and connect to the ejector.

The circulation flow path may merge with the fuel gas supply flow path at the ejector of the fuel gas supply flow path.

In the fuel cell system, as needed, the circulation flow path may be provided with a circulation pump for controlling the flow rate of the circulation gas (such as a hydrogen pump), etc.

The circulation pump may be electrically connected to the controller, and the flow rate of the circulation gas may be controlled by controlling the turning on/off, rotational frequency, etc., of the circulation pump by the controller.

The ejector may be disposed, for example, at the junction with the circulation flow path on the fuel gas supply flow path. The ejector supplies the mixed gas containing the fuel gas and the circulation gas to the anode of the fuel cell. As the ejector, a conventionally-known ejector may be used.

The fuel cell system may include the fuel off-gas discharge flow path.

The fuel off-gas discharge flow path may be connected to the anode outlet of the fuel cell. The fuel off-gas discharge flow path may branch from the circulation flow path. The fuel off-gas discharge flow path may recover the fuel off-gas which is the fuel gas discharged from the anode of the fuel cell.

The fuel off-gas includes the following, for example: fuel gas that has passed through the anode without reacting; water generated at the cathode and delivered to the anode; corroded substances generated in the catalyst layer, the electrolyte membrane, and the like; and oxidant gas that may be supplied to the anode during a purge.

The fuel off-gas discharge flow path may include a fuel off-gas discharge valve (a vent and discharge valve).

The fuel off-gas discharge valve allows the discharge of the fuel off-gas, moisture and the like to the outside (the outside of the system). The outside may be to the outside of the fuel cell system, or it may be to the outside of the vehicle.

The fuel off-gas discharge valve may be electrically connected to the controller, and the flow rate of the fuel off-gas discharged to the outside may be controlled by controlling the opening and closing of the fuel off-gas discharge valve by the controller. By controlling the opening degree of the fuel off-gas discharge valve, the pressure of the fuel gas supplied to the anode (anode pressure) may be controlled.

The fuel cell system may include an anode gas-liquid separator.

The anode gas-liquid separator may be disposed at the branch point of the fuel off-gas discharge flow path and the circulation flow path. The anode gas-liquid separator separates the moisture and fuel gas contained in the fuel off-gas, which is the fuel gas discharged from the anode outlet. Accordingly, the fuel gas may be returned to the circulation flow path as the circulation gas, or unnecessary gas, moisture and the like may be discharged to the outside from the vent and discharge valve of the fuel off-gas discharge flow path.

The fuel cell system may include an oxidant gas supplier.

The oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The fuel cell system may include an oxidant gas supply flow path.

The oxidant gas supply flow path connects the oxidant gas supplier and the cathode inlet of the fuel cell. The oxidant gas supply flow path allows the supply of the oxidant gas from the oxidant gas supplier to the cathode of the fuel cell.

The fuel cell system may include an oxidant off-gas discharge flow path.

The oxidant off-gas discharge flow path is connected to the cathode outlet of the fuel cell. The oxidant off-gas discharge flow path allows the discharge of the oxidant off-gas, which is the oxidant gas discharged from the cathode of the fuel cell, to the outside.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The fuel gas supply flow path and the oxidant gas supply flow path may be connected via a joining flow path. The joining flow path may be provided with a purge valve.

The purge valve may be electrically connected to the controller. By opening the purge valve by the controller, the oxidant gas in the oxidant gas supplier may be allowed to flow into the fuel gas supply flow path as purge gas.

The purge gas is used for purging. It may be fuel gas, oxidant gas, or mixed reaction gas containing both of them.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the circulation of the refrigerant supplied from the refrigerant supplier inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier, and the like. The secondary cell may be rechargeable by a power source outside the vehicle, such as a household power supply. The secondary cell may be charged by the output power of the fuel cell. The charge and discharge of the secondary cell may be controlled by the controller.

The fuel cell system includes the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

The fuel cell system includes the pressure detector.

The pressure detector detects the pressure information on the fuel electrode side of the fuel cell. The pressure detector may be a conventionally-known pressure sensor, pressure meter or the like. The controller may be electrically connected to the pressure detector. The pressure detector may send a detection result to the controller, and the controller may detect the pressure information on the fuel electrode side of the fuel cell detected by the pressure detector. The pressure detector may be disposed on the mixed gas supply flow path, or it may be disposed on the circulation flow path.

The fuel cell system includes a current detector.

The current detector detects a current amount of the fuel cell. The current detector may be a conventionally-known current sensor, current meter or the like. The controller may be electrically connected to the current detector. The current detector may send a detection result to the controller, and the controller may detect the current amount of the fuel cell measured by the current detector. The position to dispose the current detector is not particularly limited, as long as the current amount of the fuel cell can be detected.

The controller detects the current amount of the fuel cell.

From the detected current amount, the controller determines whether or not the amount of power generated by the fuel cell is equal to or less than the predetermined threshold.

When the amount of the power generated by the fuel cell is determined to exceed the predetermined threshold, the controller issues a normal supply command to normally supply the fuel gas to the fuel cell. On the other hand, when the amount of the power generated by the fuel cell is determined to be equal to or less than the predetermined threshold, the controller issues an intermittent supply command to intermittently supply the fuel gas to the fuel cell.

The controller may control the opening degree of the linear solenoid valve based on the pressure information on the fuel electrode side of the fuel cell.

The amount of the power generated by the fuel cell is reduced by blocking the flow paths by water. Accordingly, the amount of the power generated by the fuel cell can be used as an indicator of whether or not the flow paths are blocked by water. The threshold of the amount of the power generated by the fuel cell may be appropriately set according to the desired power generation amount.

The intermittent supply command includes a first intermittent supply command and a second intermittent supply command.

Intermittent supply sets the lower and upper limit values of the opening degree of the linear solenoid valve and changes the flow rate of the fuel gas by switching the opening degree of the linear solenoid valve to the lower or upper limit value under a predetermined condition. The intermittent supply increases the opening degree of the linear solenoid valve to the predetermined upper limit value to increase the flow rate of the fuel gas. Then, when the pressure of the fuel cell reaches the predetermined upper limit value, the opening degree of the linear solenoid valve is decreased to the predetermined lower limit value to decrease the flow rate of the fuel gas, thereby setting the pressure of the fuel cell to the predetermined lower limit value. The intermittent supply means a series of these operations. The intermittent supply may be referred to as "pulsating operation".

Exemplary conditions for switching the opening degree of the linear solenoid valve to the lower or upper limit value, are as follows. When the target pressure upper limit value is reached, the opening degree may be switched to the lower limit value. Also, the opening degree may be switched to the upper limit value when the target pressure lower limit value is reached.

The target upper and lower pressure limit values of the fuel cell may be appropriately set according to the intended use of the fuel cell.

The first intermittent supply command increases the flow rate of the fuel gas by setting the opening degree during pressure rise of the linear solenoid valve to relatively more than the second intermittent supply command. By the first intermittent supply, the water blocking the flow path can be discharged in a short time.

For the first intermittent supply command, the opening degree during pressure rise of the linear solenoid valve may be 80% or more, or it may be 100%.

For the first intermittent supply command, the opening degree during pressure drop of the linear solenoid valve is not particularly limited, and it may be 0% or more. For the first intermittent supply command, the opening degree during pressure drop of the linear solenoid valve may be 20% or more, from the viewpoint of enhancing the durability of the linear solenoid valve, from the viewpoint of shortening the intermittent supply time, and from the viewpoint of sufficiently expressing the function of the ejector.

The first intermittent supply may perform a series of the following operations only once, from the viewpoint of shorting the water discharge time: the opening degree of the linear solenoid valve is increased to the predetermined upper limit value, and then the opening degree of the linear solenoid valve is decreased to the predetermined lower limit value when the pressure of the fuel cell reaches the predetermined upper limit value.

In the second intermittent supply command, after the first intermittent supply command, the opening degree during pressure rise of the linear solenoid valve is set to relatively less than the first intermittent supply command to decrease the flow rate of the fuel gas for the predetermined time. By the second intermittent supply, the water that attached to the wall surface of the flow path can be sufficiently discharged.

For the second intermittent supply command, the opening degree during pressure rise of the linear solenoid valve may be 60% or more and 80% or less, for example.

For the second intermittent supply command, the opening degree during pressure drop of the linear solenoid valve is not particularly limited, and it may be 0% or more. From the viewpoint of enhancing the durability of the linear solenoid valve, from the viewpoint of shortening the intermittent supply time, and from the viewpoint of sufficiently expressing the function of the ejector, it may be 20% or more.

The opening degree during pressure drop of the linear solenoid valve may be different between the first intermittent supply command and the second intermittent supply command. From the viewpoint of reducing a variation in the flow rate of the fuel gas, it may be the same between them.

The predetermined amount of time for performing the second intermittent supply may be the time required to perform a series of the following operations twice or more times: the opening degree of the linear solenoid valve is increased to the predetermined upper limit value, and then the opening degree of the linear solenoid valve is decreased to the predetermined lower limit value when the pressure of the fuel cell reaches the predetermined upper limit value. The predetermined amount of time for performing the second intermittent supply may be longer than the amount of time for performing the first intermittent supply, from the viewpoint of securing the amount of time for draining the water attached to the flow path.

FIG. 1 is a schematic configuration diagram showing an example of the fuel cell system of the disclosed embodiments.

A fuel cell system 100 shown in FIG. 1 includes a fuel cell 10, a fuel gas supplier 20, a fuel gas supply flow path 21, a fuel gas flow control valve 22, a mixed gas supply flow path 23, a circulation flow path 24, an ejector 25, an anode gas-liquid separator 26, a fuel off-gas discharge flow path 27, a vent and discharge valve 28, a controller 50, a pressure detector 60 and a current detector 70. In FIG. 1, only the fuel gas system is illustrated, and other systems such as the oxidant gas system and the cooling system are not illustrated.

The pressure detector 60 is disposed on the mixed gas supply flow path 23, and it measures the pressure value of the mixed gas at the anode inlet. The pressure detector 60 is electrically connected to the controller 50 as indicated by a dashed line, and it sends the measured pressure value of the mixed gas to the controller 50.

The current detector 70 measures the current value of the fuel cell 10. The current detector 70 is electrically connected to the controller 50, and it sends the measured current value of the fuel cell 10 to the controller 50.

The controller 50 is electrically connected to the fuel gas flow control valve 22, and it controls the opening degree of the fuel gas flow control valve 22 based on the detected results of the current value of the fuel cell 10 and the pressure value of the mixed gas.

The anode gas-liquid separator 26 is disposed at the branch point of the fuel off-gas discharge flow path 27 and the circulation flow path 24. The anode gas-liquid separator 26 separates the fuel gas and moisture from the fuel off-gas, which is the fuel gas discharged from the anode outlet, and then it returns the separated fuel gas to the circulation flow path 24 as the circulating gas.

The controller 50 is electrically connected to the vent and discharge valve 28. As needed, it opens the vent and discharge valve 28 and discharges unnecessary gas, moisture and the like separated in the anode gas-liquid separator 26 from the fuel off-gas discharge flow path 27 to the outside.

Figure 2:
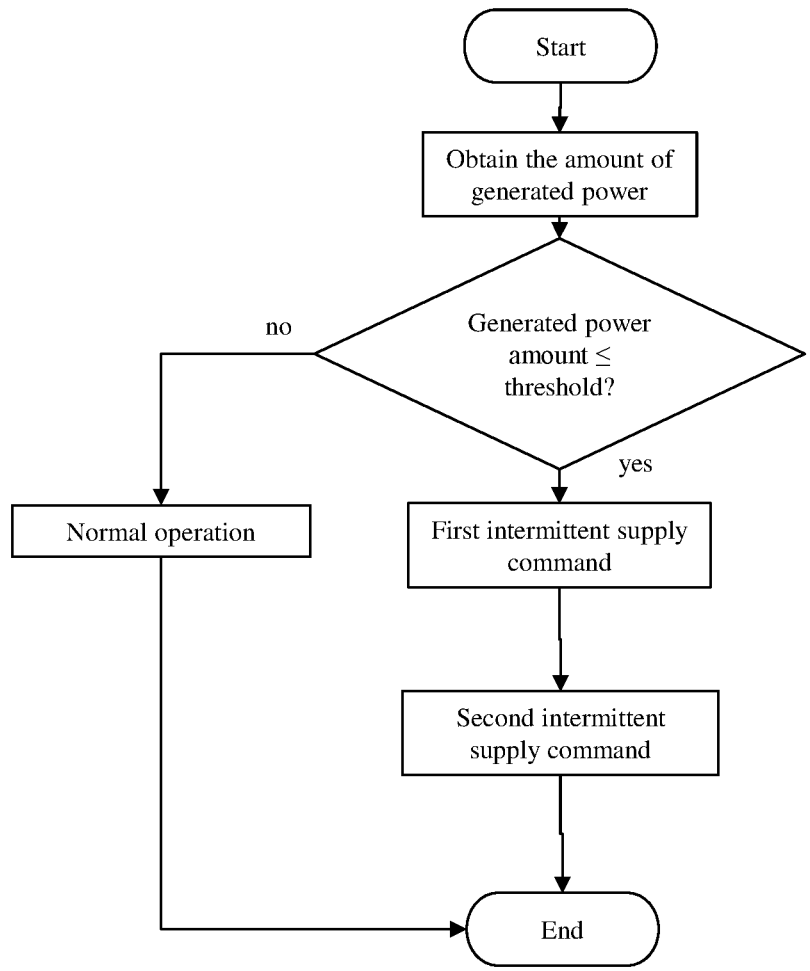
FIG. 2 is a flowchart illustrating an example of the control of the fuel cell system of the disclosed embodiments.

FIG. 2 is a flowchart illustrating an example of the control of the fuel cell system of the disclosed embodiments.

First, the amount of the power generated by the fuel cell is obtained. It is determined whether or not the amount of the power generated by the fuel cell is equal to or less than the predetermined threshold. When the amount of the power generated by the fuel cell exceeds the predetermined threshold, normal operation of the fuel cell is performed. On the other hand, when the amount of the power generated by the fuel cell is equal to or less than the predetermined threshold, the first intermittent supply is performed once. Then, the second intermittent supply is performed for the predetermined time, and the control is completed.

Figure 3:
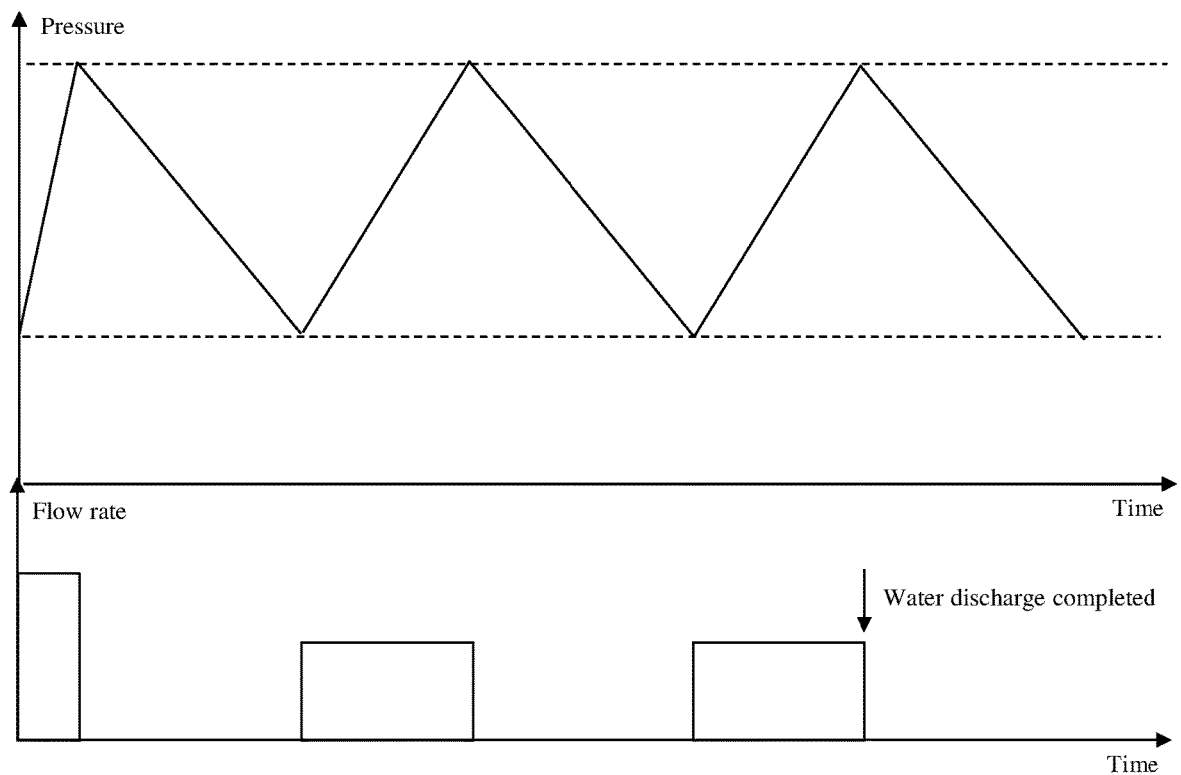
FIG. 3 is a diagram showing an example of the relationship between fuel gas flow rate and time in the case of controlling the fuel cell system of the disclosed embodiments, and the relationship between pressure and time.

FIG. 3 is a diagram showing an example of the relationship between fuel gas flow rate and time in the case of controlling the fuel cell system of the disclosed embodiments, and the relationship between pressure and time.

In FIG. 3, the first intermittent supply is performed once, and then the second intermittent supply is performed twice, thereby completing the water discharge. Accordingly, the water discharge control of the disclosed embodiments can suppress a pressure increase by reducing the valve opening time. Also, the water discharge control of the disclosed embodiments can decrease the consumption of the fuel gas and can shorten the time required for water discharge.

Figure 4:
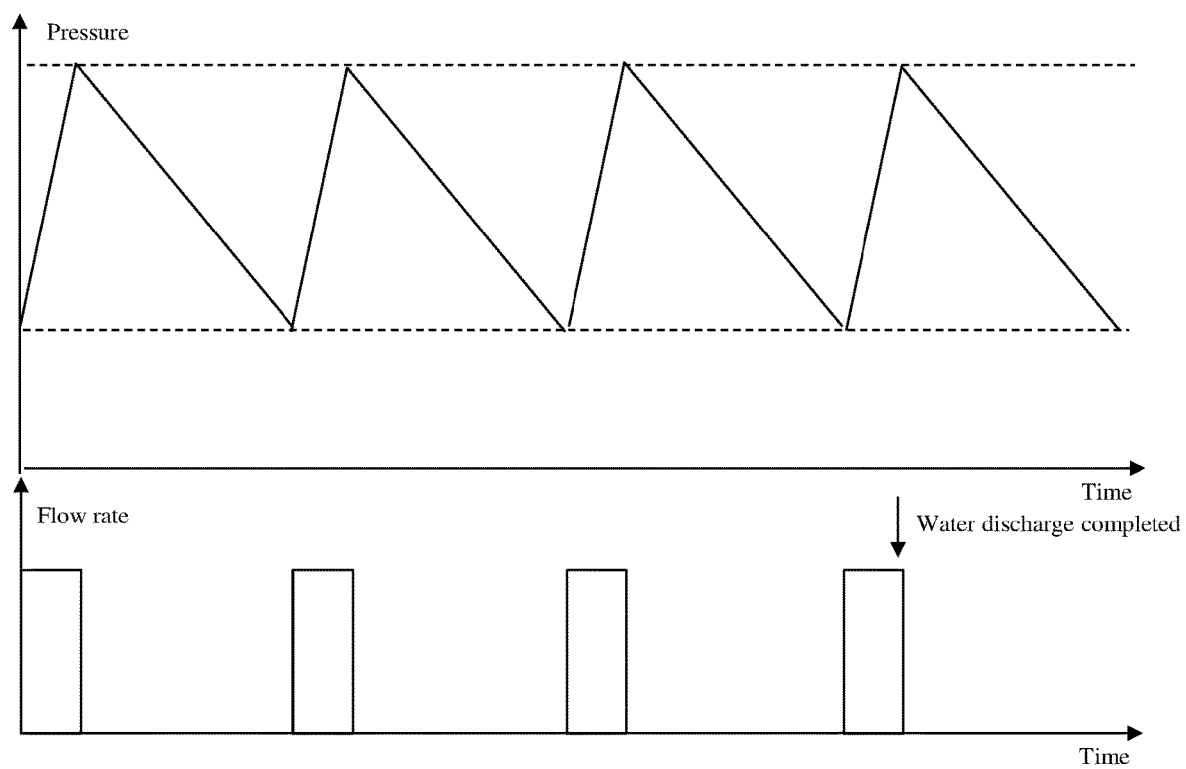
FIG. 4 is a diagram showing an example of the relationship between fuel gas flow rate and time in the case of controlling a conventional fuel cell system, and the relationship between pressure and time.

FIG. 4 is a diagram showing an example of the relationship between fuel gas flow rate and time in the case of controlling a conventional fuel cell system, and the relationship between pressure and to time.

In FIG. 4, water discharge is completed by performing the first intermittent supply four times. In the conventional water discharge control, accordingly, an increase in the valve opening time may lead to an increase in pressure. Also in the conventional water discharge control, the consumption of the fuel gas is large, and it takes a long time to complete the discharge of water containing the water attached to the wall surface of the flow path.

REFERENCE SIGNS LIST

10 Fuel cell
20 Fuel gas supplier
21 Fuel gas supply flow path
22 Fuel gas flow control valve
23 Mixed gas supply flow path
24 Circulating flow path
25 Ejector
26 Anode gas-liquid separator
27 Fuel off-gas discharge flow path
28 Vent and discharge valve
50 Controller
60 Pressure detector
70 Current detector
100 Fuel cell system

The invention claimed is:
1. A fuel cell system comprising:
a fuel cell,
an ejector,
a fuel gas supplier which supplies fuel gas to the ejector,
a circulation flow path which recovers fuel off-gas discharged from the fuel cell to return the fuel off-gas to the ejector as circulation gas,
a fuel gas supply flow path which connects the ejector with the fuel gas supplier to supply the fuel gas to the ejector,
a fuel gas flow rate control valve which is disposed on the fuel gas supply flow path to control a flow rate of the fuel gas supplied to the ejector,
a mixed gas supply flow path which connects the ejector with the fuel cell to supply mixed gas containing the fuel gas and the circulation gas from the ejector to a fuel electrode of the fuel cell,
a pressure detector which detects pressure information on a fuel electrode side of the fuel cell,
a current detector which detects a current amount of the fuel cell, and
a controller,
wherein the fuel gas flow rate control valve is a linear solenoid valve to control an opening degree of the fuel gas flow rate control valve;
wherein, from the current amount, the controller determines whether or not the amount of power generated by the fuel cell is equal to or less than a predetermined threshold;
wherein, when the amount of the power generated by the fuel cell is determined to be equal to or less than the predetermined threshold, the controller issues an intermittent supply command to intermittently supply the fuel gas to the fuel cell;
wherein the intermittent supply command includes a first intermittent supply command and a second intermittent supply command;
wherein the first intermittent supply command increases the flow rate of the fuel gas by setting the opening degree during pressure rise of the linear solenoid valve to relatively more than the second intermittent supply command;
wherein, after the first intermittent supply command, the second intermittent supply command decreases the flow rate of the fuel gas for a predetermined time by setting the opening degree during pressure rise of the linear solenoid valve to relatively less than the first intermittent supply command, and
wherein, for the first intermittent supply command, the opening degree during pressure rise of the linear solenoid valve is 100%.

* * * * *